(12) United States Patent
Humphrey (10) Patent No.: US 6,517,092 B2
(45) Date of Patent: Feb. 11, 2003

(54) FOUR-WHEELED PUSH VEHICLE

(76) Inventor: Allen Dale Humphrey, P.O. Box 470, LaPort, TX (US) 77572-0470

(*) Notice: Subject to any disclaimer, the term of this patent is extended or adjusted under 35 U.S.C. 154(b) by 0 days.

(21) Appl. No.: 09/683,934

(22) Filed: Mar. 5, 2002

(65) Prior Publication Data

US 2002/0167141 A1 Nov. 14, 2002

Related U.S. Application Data (60) Provisional application No. 60/290,610, filed on May 11, 2001.

(51) Int. Cl.$^7$ ................................................ B62M 1/00
(52) U.S. Cl. .............................. 280/87.041; 280/87.043
(58) Field of Search .................... 280/87.041, 87.042, 280/87.043, 87.01, 87.03, 87.021, 263, 35, 755

(56) References Cited

U.S. PATENT DOCUMENTS

| | | | | |
|---|---|---|---|---|
| 502,576 A | * | 8/1893 | Newman | 280/87.01 |
| 751,785 A | * | 2/1904 | Eavenson | 280/87.01 |
| 1,289,361 A | * | 12/1918 | Bastman | 280/87.041 |
| 1,352,213 A | * | 9/1920 | O'Meara | 280/87.01 |
| 1,355,963 A | * | 10/1920 | Gustafson | 280/87.041 |
| 1,711,418 A | * | 4/1929 | Linden | 280/87.043 |
| 1,747,227 A | * | 2/1930 | Daniel | 280/87.043 |
| 2,201,440 A | * | 5/1940 | Letourneau et al. | 280/87.041 |
| 2,458,080 A | * | 1/1949 | Johnson | 280/87.043 |
| 4,204,698 A | * | 5/1980 | Mihalik | 280/87.042 |
| 4,861,052 A | * | 8/1989 | Hediger | 280/87.043 |
| 5,092,616 A | * | 3/1992 | McKinney | 280/87.043 |
| 5,316,328 A | * | 5/1994 | Bussinger | 280/755 |
| 5,328,193 A | * | 7/1994 | Shiew | 280/87.041 |
| 6,120,044 A | * | 9/2000 | Tsai | 280/87.041 |

* cited by examiner

Primary Examiner—Brian L. Johnson
Assistant Examiner—Hau Phan
(74) Attorney, Agent, or Firm—Daniel N. Lundeen; Lundeen & Dickinson, LLP (57) ABSTRACT

A pushcart comprises two wheels attached to a fixed rear transverse member and two wheels attached to a pivotal front transverse member. The rear and front transverse members connect to a slanted longitudinal member. The wheels are affixed via a fork assembly to the ends of the respective members. The placement and slanting of the longitudinal member, as well as an almost upright steering column, enables an operator to achieve a lower center of gravity, for greater maneuverability and control during use. The platform comprises closely spaced bars affixed to the longitudinal member and to the fixed rear transverse member. The closely spaced bars provide lateral support to the longitudinal member as well as a platform for riding the pushcart. A cover plate shields the one or more tie rods from foreign matter and provides an alternate foot location for the operator during the performance of tricky maneuvers. Alternate embodiments of the invention may include a brake system, wheelie bars, and an automatic power system.

26 Claims, 10 Drawing Sheets

FOUR-WHEELED PUSH VEHICLE

This application claims the benefit of U.S. Provisional Application No. 60/290,610 filed May 11, 2001.

BACKGROUND OF INVENTION

This invention is related to wheeled devices and, more particularly, to a four-wheeled device that is safely operable by children.

Many self-propelled wheeled devices exist for transportation of people or goods, as well as for recreational use. Although the bicycle is perhaps the most common of these devices, scooters, wagons, and pushcarts are also popular.

Bicycles are two-wheeled vehicles in which human power is transferred through a belt, a chain, or gears to propel the bicycle. Using a basket or a rack, some goods can be transported. Scooters also generally include two wheels under or adjacent to a platform upon which a rider stands. The scooter is propelled by one foot while the other foot remains on the platform. The conventional wheels of the scooter are usually quite small, making scooters inefficient for traveling long distances. Thus, scooters are generally used recreationally only.

Scooters are particularly popular with young children. Scooters, however, can also be dangerous because the small wheels make street navigation problematic and facilitate oversteering. An impact from a pebble or rock can cause the wheels to lock up. Since these vehicles are enjoyed for their speed, such a lockup can cause a severe accident for the operator.

Thus, there is a continuing need to provide a vehicle, for recreation or for transport that is sturdily built and safe to use for people of all ages.

SUMMARY OF INVENTION

In accordance with the embodiments described herein, a pushcart is disclosed, including a pair of rear wheels coupled to a fixed transverse member, a pair of front wheels coupled to a pivotable transverse member, a longitudinal member coupled between the fixed transverse member and the pivotable transverse member, a steering mechanism including an upright steering column fixably connected to the longitudinal member, and a riding platform disposed on the longitudinal member between the steering column and the fixed transverse member, sloped downward from front to back.

Preferably, the fixed and pivotable transverse members are the same length and the longitudinal member is longer than the transverse members. The longitudinal member is sloped downward from front to back, and the fixed transverse member is positioned lower than the pivotable transverse member. The steering mechanism is operatively coupled to control of the pivotable front transverse member, and further comprises a steering control bar, a steering transmission rod coupled to the steering control bar, and a tie rod coupled to the steering transmission rod and the pivotable transverse member. The pushcart can include a brake assembly comprising hand-operated levers, a cable, and a pair of actuators coupled to the rear wheels.

In one embodiment, the steering column leans toward the fixed transverse member by at least five degrees from a position perpendicular to the longitudinal member. In a second embodiment, the riding platform comprises spaced bars coupled between the longitudinal member and the fixed transverse member.

In another embodiment, the pushcart comprises a pair of front fork assemblies, wherein each front fork assembly is connected to an axle of one of the front wheels and a pair of rear fork assemblies, wherein each rear fork assembly is connected to an axle of one of the rear wheels. The pushcart can further include a pair of rear fork attachments coupled to the pair of rear fork assemblies, wherein each end of the fixed transverse member is connected to one of the rear fork attachments and the fixed transverse member is lower than the axles of the rear wheels. The pair of rear fork attachments further each include a bolt for connecting an extension piece to the pushcart. The extension piece can include a wheelie bar assembly or support a sail attachment. Front fork attachments can also be featured on the pushcart, such that the pivotable transverse member is lower than the axles of the front wheels.

In another embodiment, the riding platform includes a second set of spaced bars coupled between the cover plate and the rear fork attachments, wherein the second set of spaced bars are not planar to the longitudinal member.

In a preferred embodiment, the wheels of the pushcart are at least twelve inches in diameter and the fixed transverse member is at least sixty percent the length of the longitudinal member. Also, preferably, the fixed transverse member is at least two inches lower than the pivotable transverse member. The pivotable transverse member is preferably lower than the front wheel axle by at least one eighth of a diameter of the front wheel and the fixed transverse member is lower than the rear wheel axle by at least one fourth of a diameter of the rear wheel.

Advantages and other features of the invention will become apparent from the following description, the drawings, and the claims.

DETAILED DESCRIPTION

In accordance with the embodiments described herein, a pushcart is disclosed for vehicular transport or for recreation. An operator controls the pushcart by running behind the pushcart while pushing a steering control bar. When the desired speed has been obtained, the operator steps onto a platform or cover plate and rides. The steering control bar is of a height comfortable to the operator and is slightly slanted towards a rear transverse member. A steering transmission rod is utilized to transfer the force from the steering control bar to a steering transmission bar, to one or more tie rods, and then up through a pivotal front transverse member. Alternate embodiments of the invention may support a brake system, wheelie bars, a sail attachment, a shock absorber assembly, and an automatic power system.

Figure 1:
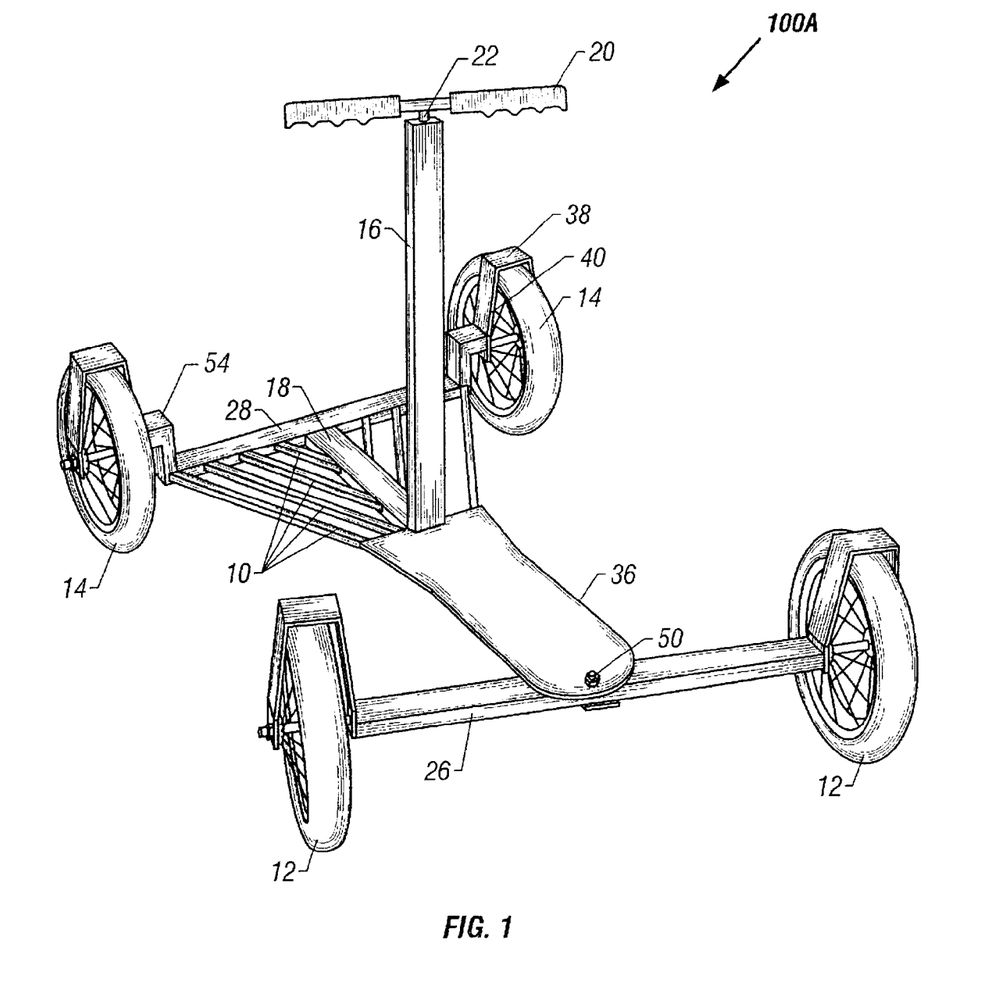
FIG. 1 is a perspective view of a four-wheeled pushcart according to one embodiment.
Figure 7:
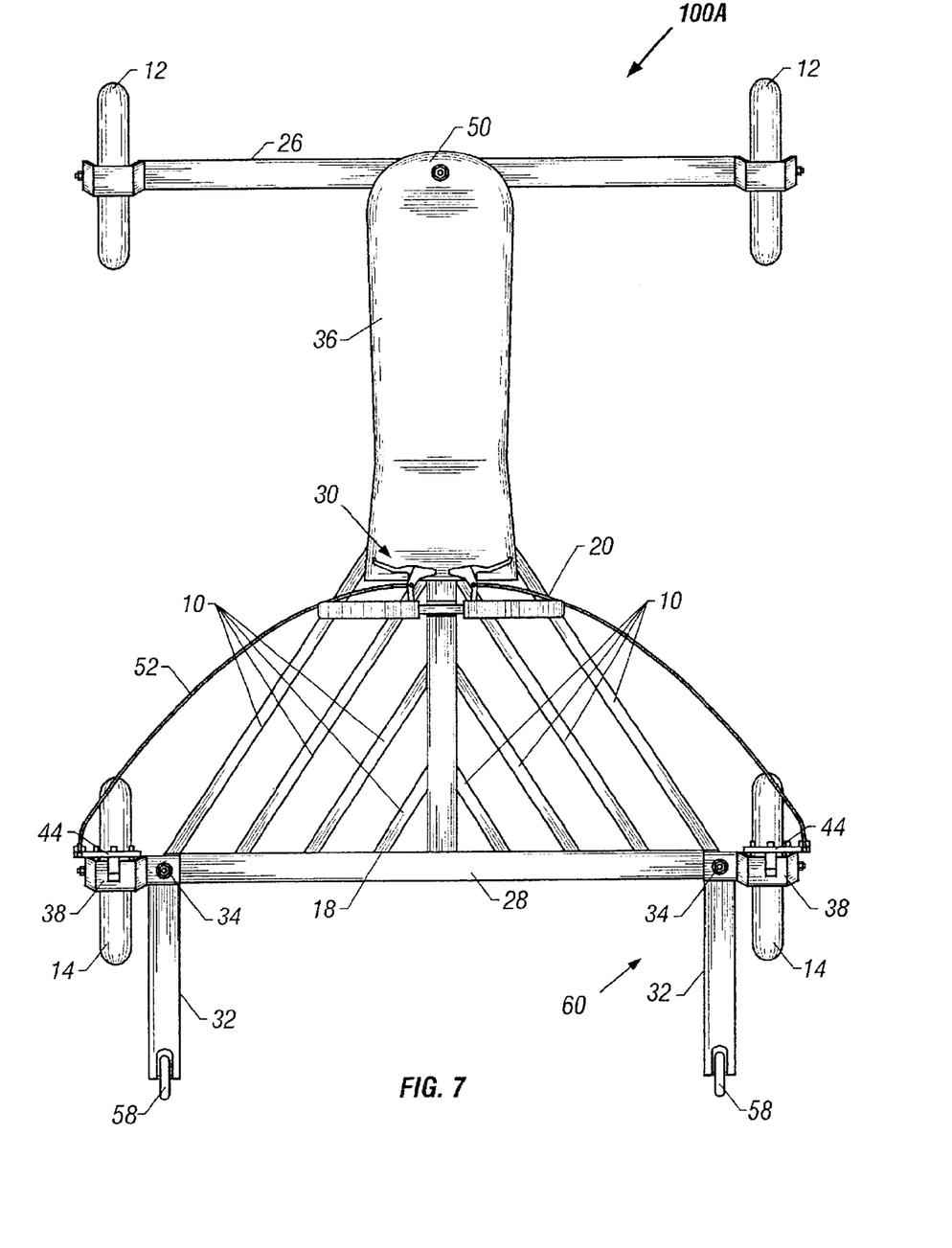
FIG. 7 is a top perspective view of the four-wheeled pushcart of FIG. 1 with wheelie bars and brake assembly attached.

As can be seen in FIG. 1, a pushcart 100A comprises a platform 10, a pair of front wheels 12, a pair of rear wheels 14, an almost upright steering column 16 mounted on a fixed longitudinal member 18, a steering control bar 20, a steering transmission rod 22, a pivotable front transverse member 26 and a fixed rear transverse member 28. Optionally, the pushcart can include a brake assembly 30 (FIGS. 2 & 5) for stopping the rear wheels 14 during use or a wheelie bar assembly 60 (FIG. 7).

The platform 10 is formed by a plurality of closely spaced bars welded at opposite ends thereof at an angle between the longitudinal member 18 and the fixed rear transverse member 28. The fixed rear transverse member 28 connects to the longitudinal member 18 that, in turn, attaches to the pivotal front transverse member 26. In one embodiment, the longitudinal member is angled five degrees from a plane parallel to the riding surface.

Figure 2:
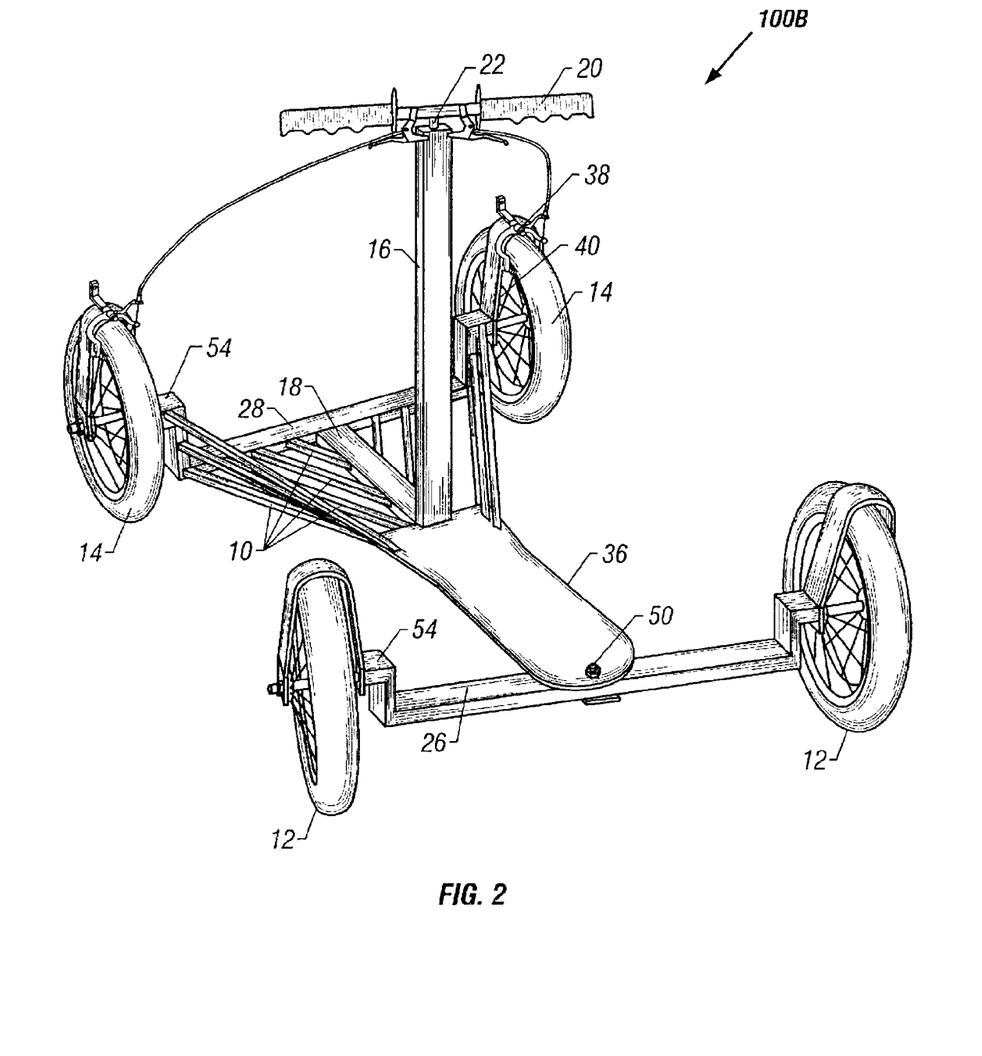
FIG. 2 is a perspective view of a four-wheeled pushcart according to a second embodiment.

In the pushcart 100B, according to a second embodiment (FIG. 2), the closely spaced bars comprising the platform 10 extend not just planar to the longitudinal member 18, but are also connected along a pair of fork attachments 54 to a cover plate 36 which covers the longitudinal member 18. The additional bars are non-planar with the rest of the platform, but extend, instead, elevated from the platform. The non-planar arrangement of the additional platform bars creates a cage-like effect and may lessen the opportunity for the operator's foot to hit one of the rear wheels. FIG. 2 also depicts the optional brake assembly 30, including brake cable 52 and rear wheel brake actuators 44, surrounding each rear wheel 14 and coupled to a rounded fork assembly 38.

Figure 3:
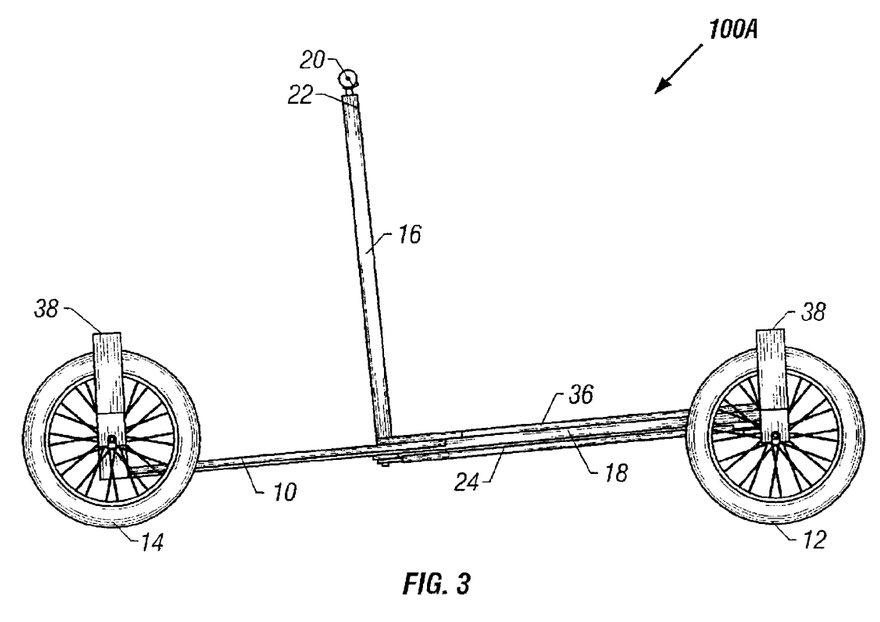
FIG. 3 is a side elevational view of the four-wheeled pushcart of FIG. 1 with the rear wheels on the left and the front wheels on the right.

In either embodiment, the fixed rear transverse member 28 is lower in relation to the ground than the pivotable front transverse member 26, as illustrated in the side elevational view of FIG. 3. Assuming the front and rear wheels are resting on a substantially planar surface, the rear transverse member 28 is closer to the planar surface, by about two inches, in one embodiment, than the front transverse member 26. Thus, the entire platform 10 slants towards the rear of the pushcart 100A.

The lower platform results in a lower center of gravity for the operator of the pushcart. Coupled with a sturdy chassis construction (see FIGS. 12A and 12B), maintaining a low center of gravity for the operator lessens the likelihood that the operator will lose control of or be thrown from the pushcart.

The slanting of the platform 10, the longitudinal member 18, and the corresponding cover plate 36 also provide greater balance and stability of the pushcart while increasing its maneuverability. The cover plate 36 allows an operator an alternate location for foot placement, such as when performing special maneuvers, while avoiding contact with the one or more tie rods 24.

Two fork attachments 54 couple each side of the fixed transverse member 28 to the respective fork assemblies 38. The fork attachments 54 allow for bigger wheels 12, 14 to be used while the pushcart 100B platform remains the same distance from a riding surface as the pushcart 100A, which has smaller wheels 12, 14. In the pushcart 100B, the wheels 12, 14 have a twelve-inch diameter. However, the pushcart can support wheels of many different sizes, such as sixteen-inch or twenty-inch wheels.

The fork attachments also permit the front and/or rear transverse members to be connected below the respective wheel axles, rather than be planar to the wheel axles. The pushcart 100B (FIG. 2) includes fork attachments adjacent to each wheel 12, 14, while the pushcart 100A (FIG. 1) has fork attachments only adjacent to the rear wheels 14.

The fork assemblies 38 of the pushcarts 100A and 100B also differ. Each fork assembly 38 surrounds its respective wheel without making contact thereto, and connects at each end of the wheel's axle. The fork assembly 38 of FIG. 1 is squared at the top while the fork assembly of FIG. 2 is more rounded in shape.

Figure 4:
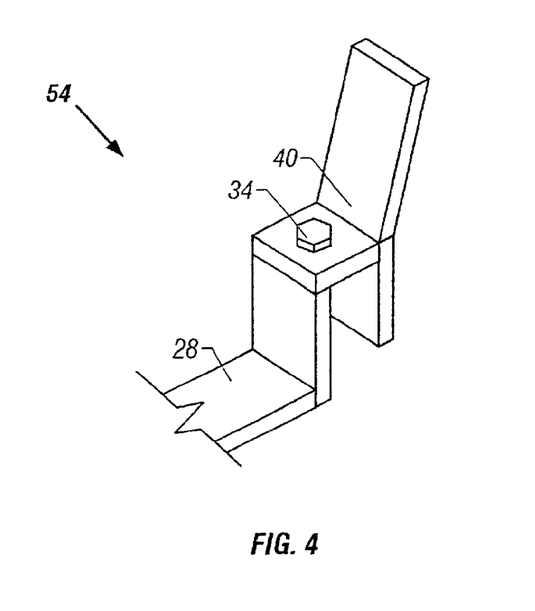
FIG. 4 is a perspective view of the fork attachment of the four-wheeled push cart of FIG. 1.

One embodiment of the fork attachment 54 is depicted in FIG. 4. the inside fork member 40 of the fork assembly 38 is fixably attached to the fork attachment, creating a unitary arrangement between the fork assembly and the transverse member. An optional bolt 34 enables an extension piece to be added to the back of the pushcart, such as for a wheelie bar assembly (see FIG. 7) or for a sail attachment.

Figure 5:
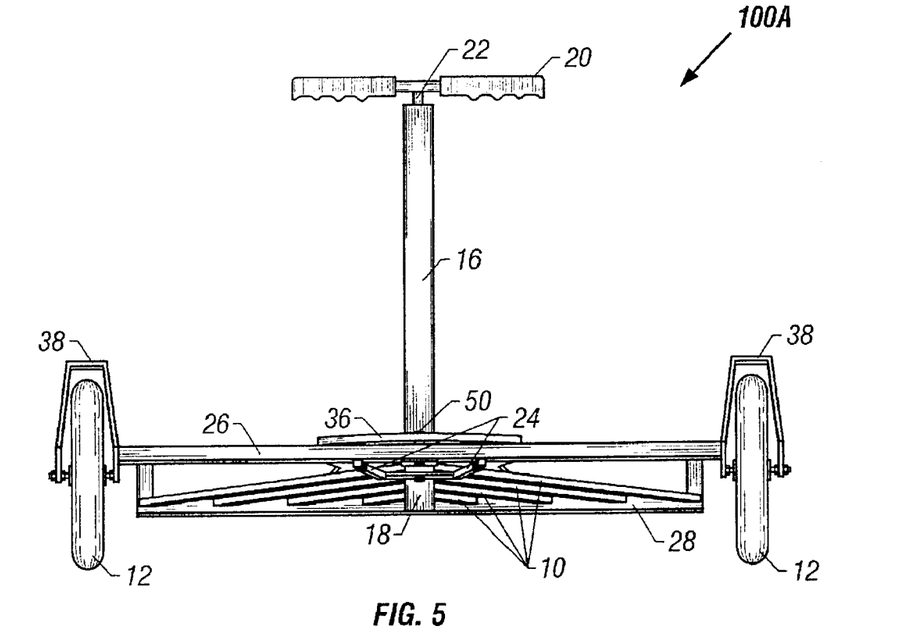
FIG. 5 is a front elevational perspective view of the four-wheeled pushcart of FIG. 1.
Figure 6:
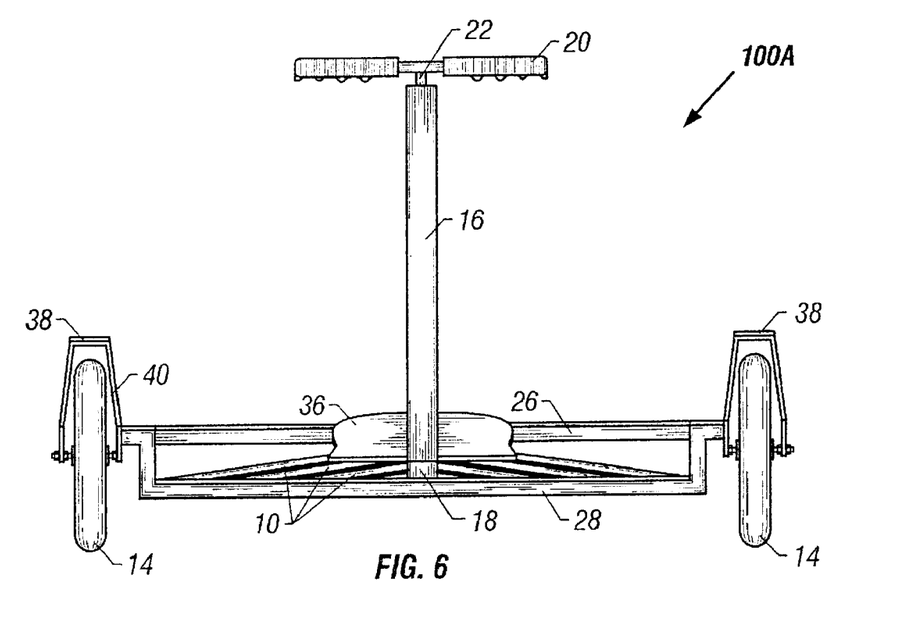
FIG. 6 is a rear elevational perspective view of the four-wheeled pushcart of FIG. 1.

FIGS. 5 and 6 depict front and rear elevational perspective views, respectively, of the four-wheeled pushcart 100A. Each wheel 12, 14 is mounted in a fork assembly 38, as shown. The inside fork members 40 for the front wheels 12 of the fork assembly 38 are affixed to the respective ends of the pivotable front transverse member 26, such as in FIG. 5; likewise, the inside fork member 40 for the rear wheels 14 are affixed to the respective ends of the fixed rear transverse member 28, such as in FIG. 6.

In the front view of FIG. 5, two tie rods 24 are visible under the cover place 36 of the pushcart 100A. The tie rods are part of the steering mechanism of the pushcart, as they pull the front transverse member according to a change in position of the steering control bar 20. Optionally, the pushcart can have one tie rod (see pushcart 100A in FIG. 9) or two tie rods (see pushcart 100B in FIG. 8).

When two tie rods are employed, the steering is more limited than with a single tie rod. The dual tie rod configuration may be preferred when the pushcart 100 is used on hills, in industrial environments, with small children, or for other applications in which safety is a primary consideration.

A top perspective view of the pushcart (FIG. 7) shows the brake assembly 30, including brake cable 52 and rear wheel brake actuators 44, surrounding each rear wheel 14 at the top. In an alternative embodiment, the brake cable 52 is coupled to the steering column 16 and is substantially hidden under the platform 10 before connecting to the brake actuators 44, which may themselves be positioned differently than as shown.

In FIG. 7, the brake assembly 30 is connected to the rear wheels 14. Alternatively, the brake assembly can be connected to the front wheels, although, preferably, the connection of brakes to the rear wheels is maintained. By using rear wheel brakes during use, the operator is less likely to be thrown from the pushcart during sudden stops.

FIG. 7 further depicts an optional wheelie bar assembly 60, comprising a wheelie bar 32 and wheel 58 coupled to the fixed rear transverse member 28 by the optional bolt 34 (see also FIG. 4). The bolt 34 may be a screw or other connecting means for fixably securing the wheelie bar 32 to the fixed member 28. The wheelie bar 32 extends from the back of the pushcart parallel to the riding surface during normal use, e.g., when all four wheels are on the riding surface.

When the front of the pushcart is momentarily lifted off the riding surface, such as during maneuvers, the wheelie bar assembly 60 limits how high the front can be removed from the surface while the rear wheels 14 are balancing the pushcart. Further, the wheelie bar assembly 60 ensures that the pushcart will not topple during such maneuvers, but will eventually return to the normal position. The wheelie bar assembly 60 thus provides an additional measure of safety while maintaining the stability of the pushcart during maneuvers.

Figure 8:
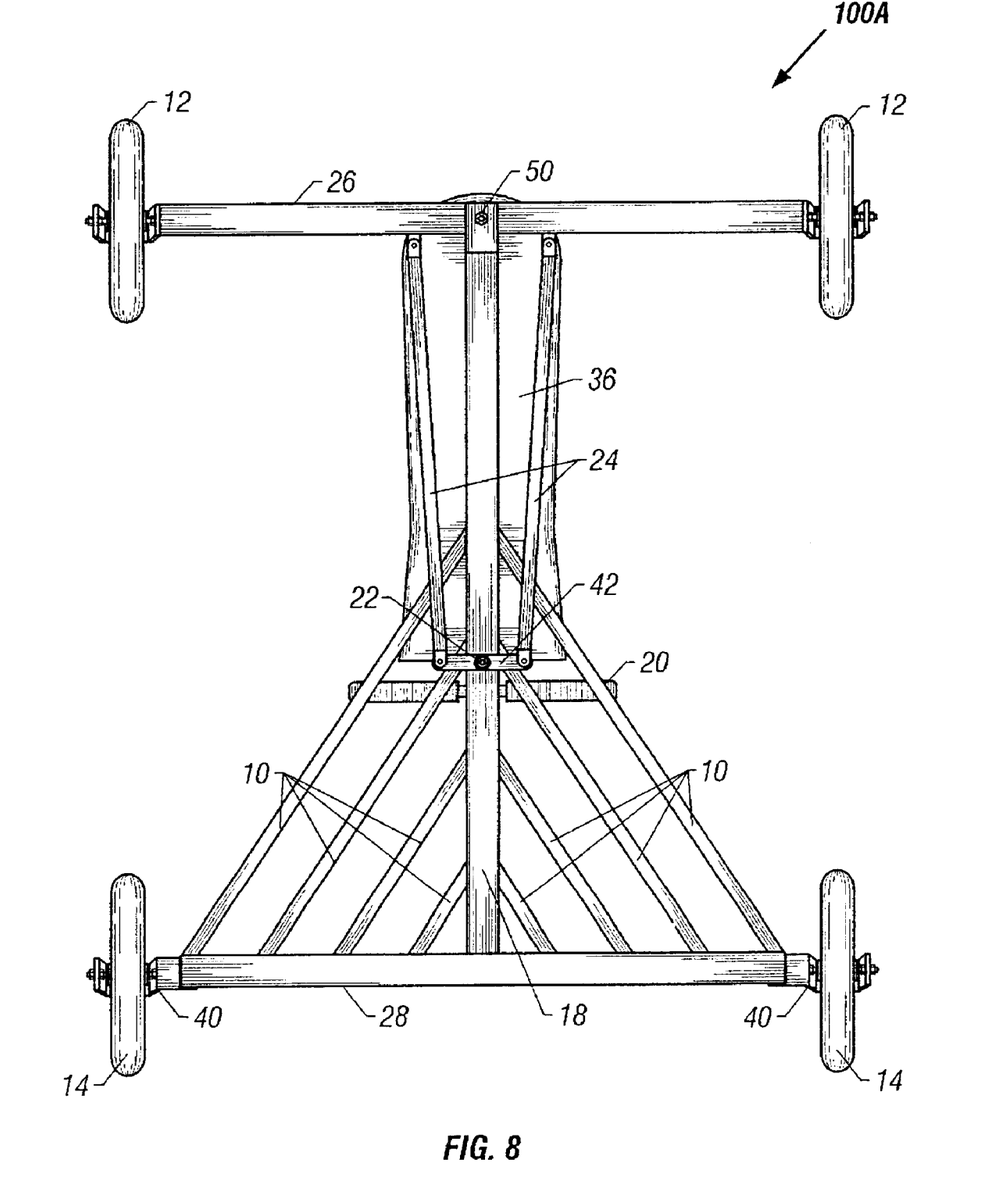
FIG. 8 is a bottom perspective view of the four-wheeled pushcart of FIG. 1.
Figures 9, 10, 11:
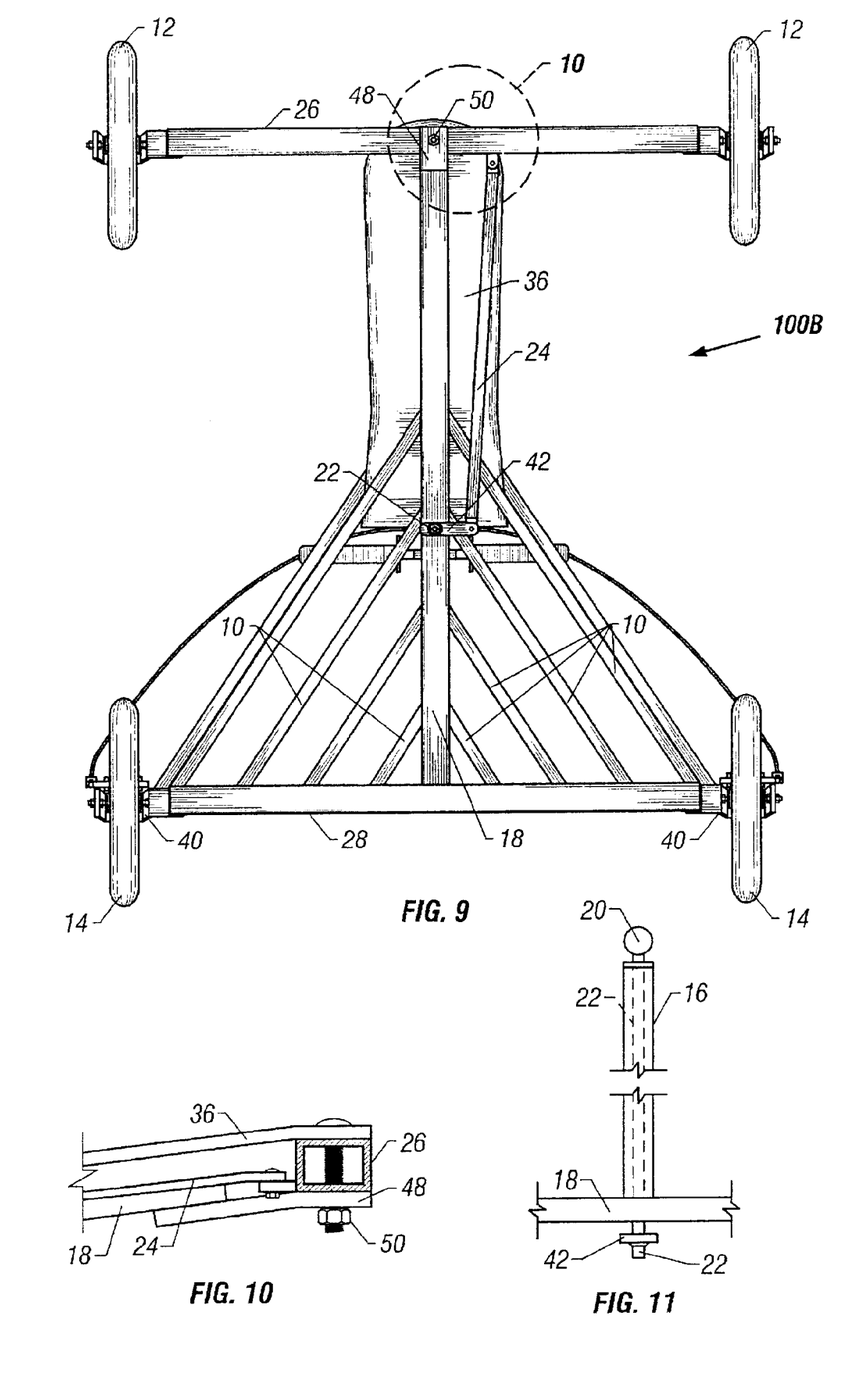
FIG. 9 is a bottom perspective view of the four-wheeled pushcart of FIG. 2.
FIG. 10 is a side view of part of the steering transmission system of the pushcart of FIGS. 1 and 2.
FIG. 11 is a side perspective view of the steering column and the steering transmission rod for the four-wheeled pushcarts of FIGS. 1 and 2.
Figure 13A:
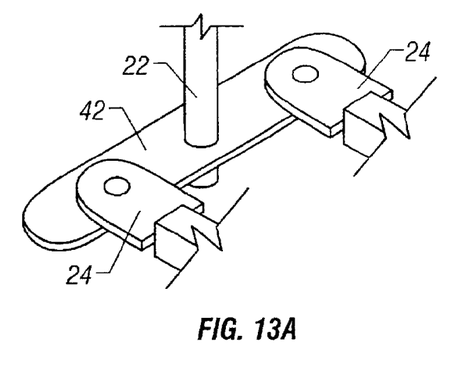
FIGS. 13A and 13B are detailed views of the steering transmission bar for two tie rod and single tie rod pushcarts, respectively.
Figure 13B:
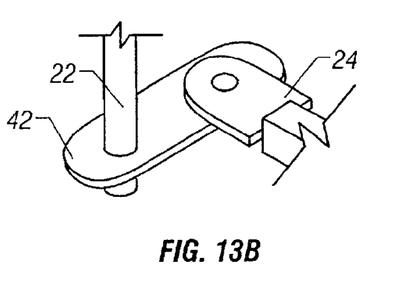
Figure 14A:
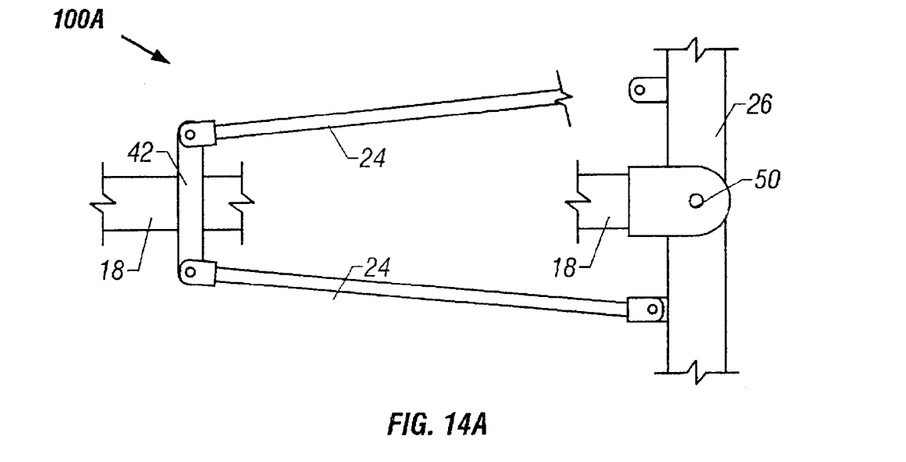
FIGS. 14A and 14B are bottom perspective views of the steering control system for the pushcarts of FIGS. 1 and 2, respectively.
Figure 14B:
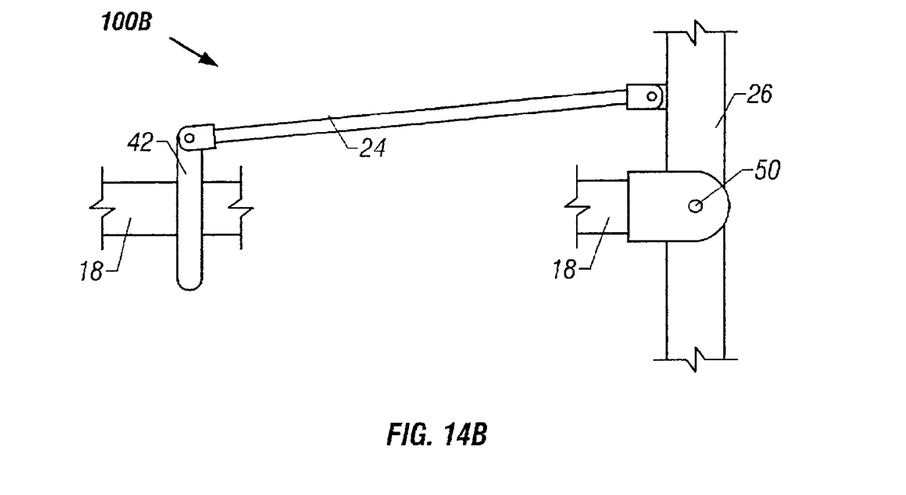

FIGS. 8 and 9 are bottom perspective views of the pushcarts 100A and 100B, respectively. In the pushcart 100A (FIG. 8), two tie rods 24 are connected at their respective front ends to the pivotable transverse member 26 on either side of a pivot 50. The tie rods 24 are secured to each end of a steering transmission bar 42, the center of which is connected to the longitudinal member 18. See also FIGS. 13A and 14A. The pushcart 100B (FIG. 2) includes one tie rod 24 instead of two. In FIG. 9, the steering transmission bar 42 engages with the longitudinal member 18 at one end while the other end of the bar is coupled to the tie rod 24. The front transverse member 26 is pivotally attached to the front end of the longitudinal member 18 and the forward end of the tie rod 24 on one side of a pivot 50. See also FIGS. 13B and 14B. In FIG. 9, the tie rod 24 is shown on one side of the pivot 50; however, the tie rod can instead be placed on the other side of the pivot.

In the side view of FIG. 10, the one or more tie rods 24 are sandwiched between the cover plate 36 and the longitudinal member 18 at the pivot 50. The longitudinal member is fixably attached to an end member 48, which includes a hole through which the pivot 50 is engaged.

The end member is parallel to the riding surface at the pivot point, but then becomes non-parallel by the same degree that the longitudinal member is angled upward, relative to the riding surface. In one embodiment, the end member 48 is angled five degrees from a plane parallel to the riding surface at the attachment to the longitudinal member 18. The one or more tie rods 24 are further connected to the pivotable front transverse member 26.

The steering transmission bar 42 is coupled to the steering transmission rod 22. As depicted in FIG. 11, the steering transmission rod 22 is rotatably mounted within the steering column 16, fixably connected to the steering control bar 20 at the top end, and fixably connected to the steering transmission bar 42 at the bottom end.

When the steering is engaged by moving the steering control bar 20, the steering transmission rod 22 transfers the movement to the steering transmission bar 42, which causes the one or more tie rods 24 to move the pivotable front transverse member 26, which causes the front wheels 12 to change position. The height of the steering control bar 20 and respective steering transmission rod 22 and steering column 16 may be sized according to the operator's height.

Preferably, the height is within the comfortable hand steering range of the operator. In one embodiment, separate sizes of the pushcart 100 are available for small children, teenagers, and adults.

The almost upright steering column 16 is affixed to the longitudinal member 18 between the fixed rear transverse member 28 and the midpoint of the longitudinal member 18. In one embodiment, the steering column 16 is perpendicular to the slanting longitudinal member 18. However, because the longitudinal member is angled slightly, relative to the riding surface, the steering column is likewise angled, in a direction toward the rear wheels 14. In a second embodiment, the steering column 16 is affixed between five and fifteen degrees from a position perpendicular to the slanting longitudinal member, in a direction toward the rear wheels 14. The steering transmission rod 22 and steering transmission bar 42 are adjusted for this angular offset, if needed.

Operation of the pushcart is performed by running behind the cart and pushing on the steering control bar 20, then jumping onto the platform 10 of the pushcart when the desired speed is attained, and steering via the steering control bar 20. Instead of running, the operator may rest one foot by placing it on the platform 10 while the other foot continues to push.

The almost upright steering column 16 as well as the back-sloping of the platform 10 encourage the operator to stand toward the back of the pushcart. Preferably, the operator stands on the platform 10 with knees slightly bent, for a lower center of gravity. One of the feet pushes against the riding surface, causing the pushcart to move forward. The feet alternately push against the riding surface, causing the pushcart to accelerate. The steering column, not quite perpendicular to the ground, is sturdy enough that the operator can lean backward or to the sides, such as during turns.

The pushcarts 100A and 100B are preferably constructed using materials familiar to manufacturers of bicycles and other recreational vehicles. Examples of suitable materials include steel alloy, high-carbon steel, chrome-molybdenum, manganese-molybdenum, carbon fiber and aluminum. The various components are preferably welded together, creating a stiff, sturdy chassis.

Figure 12A:
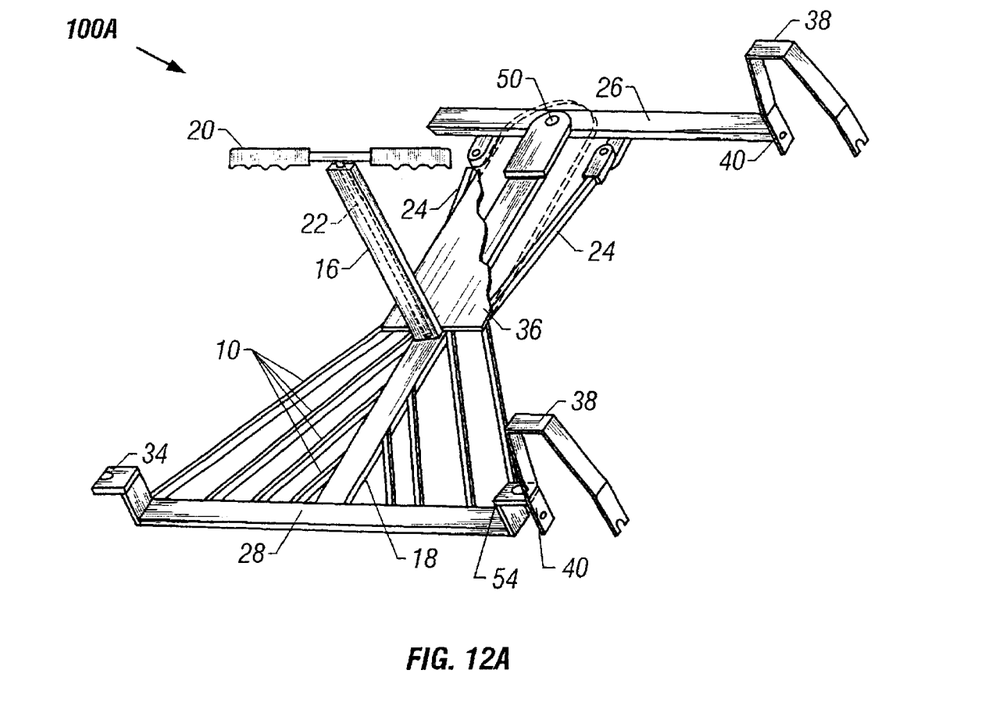
FIGS. 12A and 12B are perspective views of the chassis of the pushcarts of FIGS. 1 and 2, respectively.
Figure 12B:
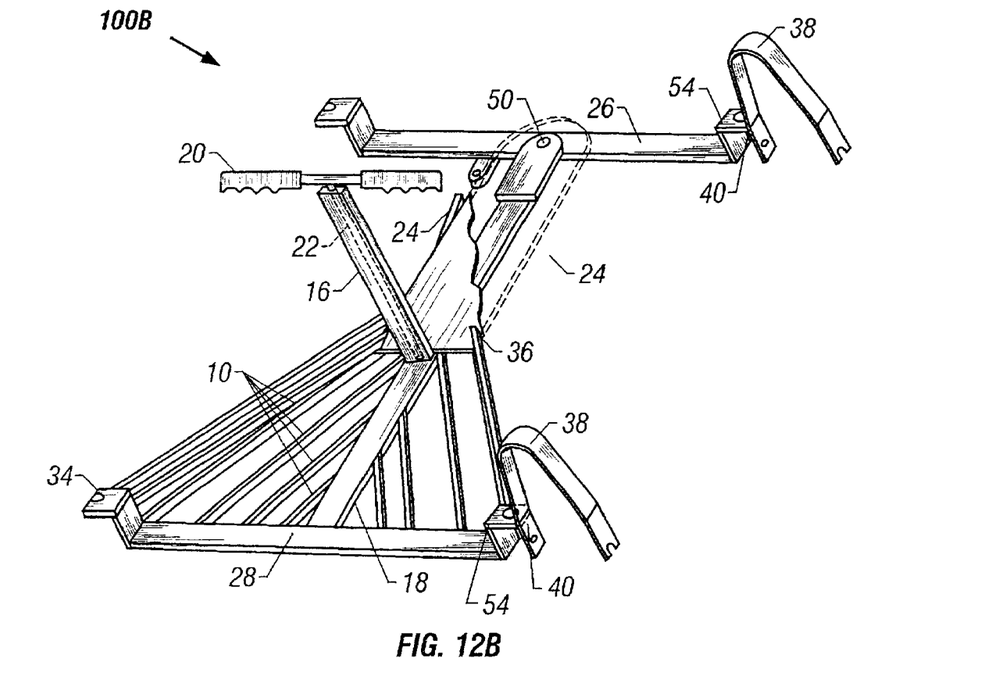

In FIG. 12A, the chassis of the pushcart 100A, including two tie rods 24, flat fork assemblies 38, fork attachments 54 in the rear only, and an angled planar platform 10, is depicted. The steering mechanism (steering control bar 20, steering transmission rod 22, and the tie rods 24) is movable, as is the front transverse member, along the pivot 50. The remaining components are connected in a fixed, unmovable relation to one another, such as by welding them together. The solid construction results in a durable chassis that requires little effort to maintain, according to one embodiment.

The chassis of the pushcart 100B (FIG. 12B) is distinguishable from the pushcart 100A, in that a single tie rod 24 controls the wheel position, the fork assemblies 38 are rounded, and fork attachments are disposed in both the front and rear fork assemblies, such as for supporting larger wheels. Further, with the spaced bars of the platform extending across the cover plate 36 to the fork attachments 54, the cage-like platform 10 is evident in this embodiment.

The chassis of the pushcart is substantially square in shape. The wheels 12, 14 extend outward from the chassis, such that the wheels are generally the first part of the pushcart to make contact in a collision, whether the collision is from the front or from the rear. In particular, a collision with another pushcart is likely to impact the tires of the vehicle first.

Figure 15:
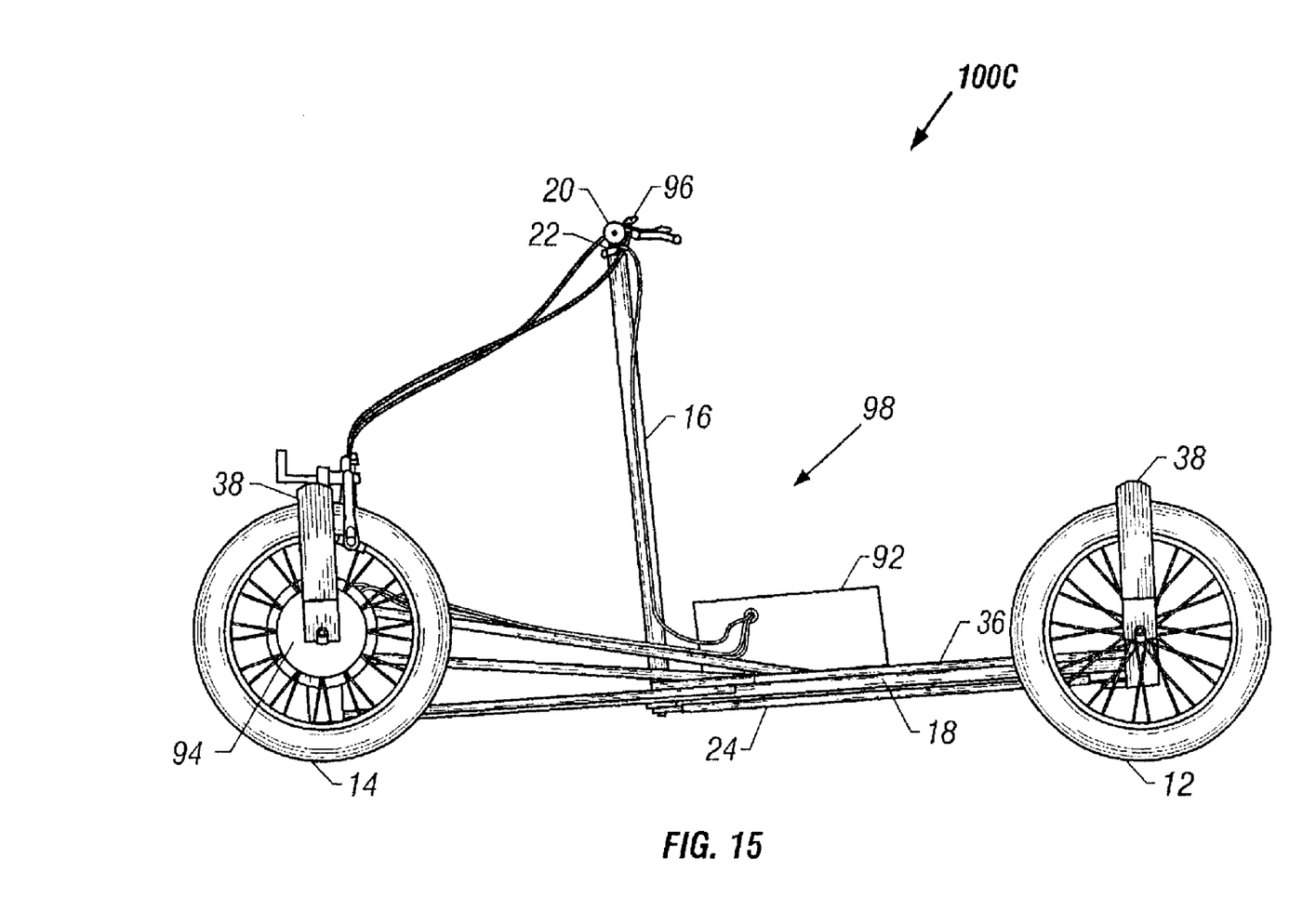
FIG. 15 is a side perspective view of an automatically powered pushcart according to one embodiment of the invention.

In addition to manually powering the pushcart, the pushcart can include features for automatic operation. For example, in FIG. 15, the pushcart 100C includes an automatic power assembly 98, including a battery box 92, a hub motor 94, and an accelerator 96. The battery box 92 is mounted on the cover plate 36, in front of the steering assembly. The battery box 92 is coupled to a hub motor 94, which is fitted into the rear wheel, in one embodiment. The battery box 92 supplies power to the hub motor 94, and may include rechargeable batteries. The battery box is likewise coupled to an accelerator 96. The accelerator 96 may be a gripping device mounted on the steering control bar 20. In one embodiment, the automatic power assembly 98 is a Heinzmann hub motor assembly, a product of Fritz Heinzmann GmbH & Co., of Germany.

Besides the optional wheelie bar attachment 60 and the brake assembly 30, the pushcart can be equipped with other features. For example, in one embodiment, a sail attachment can be connected to back of the pushcart. For example, a mast connector or mast holder can be attached to the fixed rear transverse member 28, or, more particularly, to the fork attachment 54 by removing the bolt 34, adding the mast connector, and re-connecting the bolt. A sail with a mast can then be either connected or otherwise engaged with the mast connector or holder.

In one embodiment, an eighteen-inch platform is fixably attached to the cover plate 36, upon which a removable child car seat is secured. This "crow's nest" configuration enables a child to "tour" while another person operates the pushcart. With the electric motor attached, the pushcart becomes an electric stroller.

As another option, the pushcart can include a shock absorber system, such as in the fork assembly. The pushcart can further be equipped with attachments for water bottles, a basket for carrying items, and other accessories familiar to bicycle enthusiasts.

The many safety features of the pushcart 100 make it a desired candidate for many recreational and non-recreational uses. The sturdy construction, the low center of gravity operator position, the cage-like arrangement of the platform, and the predisposition of the tires to make contact during collisions rather than the chassis minimize the likelihood and/or severity of accidents. The single-tie rod pushcart is available where safety is of premium concern. For the adventuresome operator, the wheelie bar attachments nevertheless enhance safety of the pushcart during use.

Trips to the zoo, the park, the rodeo, festivals and other events where long distances are traveled can be enhanced using the pushcart 100. Whether using the manual or electric model, a tour on a pushcart can, for example, traverse a greater area in a shorter time than walking. The pushing action of the operator is a healthy cardiovascular activity that rivals other vehicles, such as scooters. An elderly or disabled person riding a motorized pushcart can also manually propel the pushcart, affording some cardiovascular activity that may otherwise be impossible.

Non-recreational applications for the pushcart are likewise numerous. Warehouses, industrial sites, mailrooms, and other large facilities can use the pushcart for employee and inventory transport. Grocery stores, department and retail stores, can also provide pushcarts for employees. Applications where large areas are covered, such as management and security for parking lots, convention centers, and outdoor events, can benefit from pushcarts.

While the invention has been described with respect to a limited number of embodiments, those skilled in the art will appreciate numerous modifications and variations therefrom. It is intended that the appended claims cover all such modifications and variations as fall within the true spirit and scope of the invention.

What is claimed is:

1. A pushcart comprising:
    a pair of rear wheels coupled to a fixed transverse member;
    a pair of front wheels coupled to a pivotable transverse member;
    a longitudinal member coupled between the fixed transverse member and the pivotable transverse member;
    a steering mechanism including an upright steering column fixably connected to the longitudinal member, wherein the steering mechanism is operatively coupled to control of the pivotable front transverse member, the steering mechanism further comprising:
        a steering control bar;
        a steering transmission rod coupled to the steering control bar; and
        a tie rod coupled to the steering transmission rod and the pivotable transverse member;
        a riding platform disposed on the longitudinal member between the steering column and the fixed transverse member, sloped downward from front to back; and
    wherein the longitudinal member is sloped downward from front to back, and the fixed transverse member is positioned lower than the pivotable transverse member.

2. The pushcart of claim 1, wherein the steering column leans toward the fixed transverse member by at least five degrees from a position perpendicular to the longitudinal member.

3. The pushcart of claim 1, wherein the steering column leans toward the fixed transverse member by at least five degrees from a position parallel to a riding surface.

4. The pushcart of claim 3, further comprising:
    a pair of front fork assemblies, wherein each front fork assembly is connected to an axle of one of the front wheels; and
    a pair of rear fork assemblies, wherein each rear fork assembly is connected to an axle of one of the rear wheels.

5. The pushcart of claim 4, further comprising:
    a pair of rear fork attachments coupled to the pair of rear fork assemblies, wherein each end of the fixed transverse member is connected to one of the rear fork attachments and the fixed transverse member is lower than the axles of the rear wheels.

6. The pushcart of claim 5, wherein the pair of rear fork attachments further each comprise a bolt for connecting an extension piece to the pushcart.

7. The pushcart of claim 6, wherein the extension piece comprises a wheelie bar assembly.

8. The pushcart of claim 6, wherein the extension piece supports a sail attachment.

9. The pushcart of claim 5, further comprising:
    a pair of front fork attachments coupled to the pair of front fork assemblies, wherein each end of the pivotable transverse member is connected to one of the front fork attachments and the pivotable transverse member is lower than the axles of the front wheels.

10. The pushcart of claim 1, wherein the riding platform comprises spaced bars coupled between the longitudinal member and the fixed transverse member.

11. The pushcart of claim 4, wherein the riding platform further comprises a second set of spaced bars coupled between a cover plate and the rear fork attachments, wherein the second set of spaced bars are not planar to the longitudinal member.

12. The pushcart of claim 1, further comprising:
   a brake assembly comprising hand-operated levers, a cable, and a pair of actuators coupled to the rear wheels.

13. The pushcart of claim 1, wherein the wheels are at least twelve inches in diameter.

14. The pushcart of claim 1, wherein the wheels are at least sixteen inches in diameter.

15. The pushcart of claim 1, wherein the wheels are at least twenty inches in diameter.

16. The pushcart of claim 1, wherein the longitudinal member is longer than the transverse members.

17. The pushcart of claim 1, wherein the fixed and pivotable transverse members have about the same length.

18. The pushcart of claim 1, wherein the fixed transverse member is at least sixty percent the length of the longitudinal member.

19. The pushcart of claim 1, wherein the fixed transverse member is at least two inches lower than the pivotable transverse member.

20. The pushcart of claim 19, wherein the fixed transverse member is lower than the rear wheel axle by at least one fourth of a diameter of the rear wheel.

21. The pushcart of claim 1, wherein the pivotable transverse member is lower than the front wheel axle by at least one eighth of a diameter of the front wheel.

22. The pushcart of claim 1, wherein the longitudinal member is sloped downward from front to back by at least five degrees from a plane perpendicular to a riding surface.

23. A pushcart to traverse a riding surface, the pushcart comprising:
   a pair of front wheels coupled to a pivotable front transverse member a pair of rear wheels coupled to a fixed rear transverse member;
   a longitudinal member coupled between the fixed rear transverse member and the pivotable front transverse member;
   the fixed rear transverse member positioned lower than the pivotable front transverse member such that the longitudinal member is sloped downward from front to book;
   a steering mechanism including an upright steering column disposed upon the longitudinal member, the steering mechanism configured to manipulate the pivotable front transverse member;
   a riding platform disposed on the longitudinal member between the steering column and the fixed transverse member, the riding platform sloped downward from front to back and further disposed between the pair of rear wheels; and
   the steering mechanism configured to be operated by manipulating a steering control bar in a plane substantially parallel to the plane of the riding platform.

24. The pushcart of claim 23 wherein the riding platform is positioned below an axis of rotation of the pair of rear wheels.

25. A pushcart to traverse a riding surface, the pushcart comprising:
   a pair of front wheels coupled to a pivotable front transverse member a pair of rear wheels coupled to a fixed rear transverse member;
   a longitudinal member coupled between the fixed rear transverse member and the pivotable front transverse member;
   the fixed rear transverse member positioned lower than the pivotable front transverse member such that the longitudinal member is sloped downward from front to back;
   a steering mechanism including an upright steering column disposed upon the longitudinal member, the steering mechanism, configured to manipulate the pivotable front transverse member;
   a riding platform disposed on the longitudinal member between the steering column and the fixed transverse member, the riding platform sloped downward from front to back and further disposed between the pair of rear wheels; and
   the steering mechanism configured to be operated by manipulating a steering control bar in a plane substantially parallel to the plane of the riding surface.

26. The pushcart of claim 25 wherein the riding platform is positioned below an axis of rotation of the pair of rear wheels.

* * * * *